United States Patent
Glickman et al.

(10) Patent No.: US 7,174,048 B2
(45) Date of Patent: Feb. 6, 2007

(54) ENERGY MINIMIZATION FOR CLASSIFICATION, PATTERN RECOGNITION, SENSOR FUSION, DATA COMPRESSION, NETWORK RECONSTRUCTION AND SIGNAL PROCESSING

(76) Inventors: Jeff B. Glickman, 557 Highline Dr., Hood River, OR (US) 97031; Abel Wolman, 855 NW. Lincoln St., White Salmon, WA (US) 98672

( * ) Notice: Subject to any disclaimer, the term of this patent is extended or adjusted under 35 U.S.C. 154(b) by 103 days.

(21) Appl. No.: 11/096,126

(22) Filed: Mar. 31, 2005

(65) Prior Publication Data

US 2005/0180638 A1    Aug. 18, 2005

Related U.S. Application Data

(60) Division of application No. 09/581,949, filed on Jun. 19, 2000, now Pat. No. 6,993,186, which is a continuation of application No. PCT/US98/27374, filed on Dec. 23, 1998.

(60) Provisional application No. 60/071,592, filed on Dec. 29, 1997.

(51) Int. Cl.
    *G06K 9/40*    (2006.01)
(52) U.S. Cl. .................. 382/260; 382/159; 382/170; 382/224; 707/2
(58) Field of Classification Search ............... 382/133, 382/159, 170, 224, 260; 707/102
    See application file for complete search history.

(56) References Cited

U.S. PATENT DOCUMENTS 5,175,710 A    12/1992    Hutson
5,181,259 A    1/1993    Rorvig
5,235,506 A    8/1993    O'Brien, Jr.
5,245,587 A    9/1993    Hutson
5,321,613 A    6/1994    Porter et al.
5,348,020 A    9/1994    Hutson
5,402,335 A    3/1995    O'Brien
5,422,961 A    6/1995    Simard
5,437,279 A    8/1995    Gray
5,490,516 A    2/1996    Hutson
5,574,837 A    11/1996    Clark et al.
5,579,766 A    12/1996    Gray
5,596,644 A    1/1997    Abel et al.
5,602,938 A    2/1997    Akiyama et al.
5,625,767 A    4/1997    Bartell et al.
5,706,402 A    1/1998    Bell
5,729,451 A    3/1998    Gibbs et al.
5,802,207 A    9/1998    Huang
5,987,094 A    11/1999    Clarke et al.
6,134,541 A *    10/2000    Castelli et al. .................. 707/2

(Continued)

FOREIGN PATENT DOCUMENTS

WO    WO 99/34316    7/1999

OTHER PUBLICATIONS

Search Report, dated Aug. 24, 1999, for International Application No. PCT/US98/27374, 3 pages.

(Continued)

*Primary Examiner*—Gregory Desire
(74) *Attorney, Agent, or Firm*—Brinks Hofer Gilson & Lione

(57) ABSTRACT

A data analyzer/classifier comprises using a preprocessing step, and energy minimization step, and a postprocessing step to analyze/classify data.

22 Claims, 7 Drawing Sheets

U.S. PATENT DOCUMENTS

| | | | |
|---|---|---|---|
| 6,332,034 B1 | 12/2001 | Makram-Ebeid et al. | |
| 6,546,117 B1 | 4/2003 | Sun et al. | |
| 6,571,227 B1* | 5/2003 | Agrafiotis et al. | 706/15 |
| 6,714,897 B2* | 3/2004 | Whitney et al. | 702/189 |
| 6,732,064 B1* | 5/2004 | Kadtke et al. | 702/189 |
| 6,804,420 B2* | 10/2004 | Uehara et al. | 382/305 |
| 6,947,579 B2* | 9/2005 | Bronstein et al. | 382/118 |
| 6,968,342 B2* | 11/2005 | Wolman et al. | 707/102 |
| 6,993,186 B1* | 1/2006 | Glickman et al. | 706/20 |
| 7,039,621 B2* | 5/2006 | Agrafiotis et al. | 706/20 |
| 7,054,757 B2* | 5/2006 | Agrafiotis et al. | 702/19 |
| 7,096,206 B2* | 8/2006 | Hitt | 706/12 |

OTHER PUBLICATIONS

AGW Consulting, White Salmon, WA, "Final Report Emergent Pattern Recognition Analysis of Simulated SCADA System Data," for The Physical Science Laboratory, New Mexico State University, Las Cruces, NM, Under P.O. PSL 91541 PR, Dec. 15, 1998, 6 pages.

Arabie, P. et al., Three-way Scaling and Clustering, Sage Publications, 1987, pp. 7-53.

Baird, J. and Noma, E., "Fundamentals of Scaling and Psychophysics," John Wiley & Sons, 1978, chapter 10, "Multidimensional Scaling," pp. 177-205.

Bosch, R. and Smith, J., Separating hyperplanes and the authorship of the disputed federalist papers, American Mathematical Monthly, vol. 105, Aug.-Sep. 1998, pp. 601-608.

Carroll, J.D. and Chang, J.-J., "Analysis of individual differences in multidimensional scaling via an n-way generalization of the 'Eckart-Young' decomposition," Psychometrika, vol. 35, No. 3, Sep. 1970, pp. 283-319.

Commandeur, J. and Heiser, W., "Mathematical derivations in the proximity scaling (PROXSCAL) of symmetric data matrices," Tech. report No. RR-93-04, Department of Data Theory, Leiden University, Leiden, 1993, pp. 1-72.

de Leeuw, J. and Heiser, W., "Theory of multidimensional scaling," in P.R. Krishnaiah and L.N. Kanal, eds., Handbook of Statistics, vol. 2, North-Holland Pub. Co., New York, 1982, pp. 285-316.

Goodhill, G.J., Simmen, M. W. and Willshaw, D.J., "An evaluation of the use of Multidimensional Scaling for understanding brain connectivity," University of Edinburgh, Centre for Cognitive Science, Edinburgh, U.K., Research Paper EUCCS?RP-63, Jun. 1994, pp. 1-23.

McGee, V.E., "The multidimensional analysis of 'elastic' distances," The British Journal of Mathematical and Statistical Psychology, vol. 19, part 2, Nov. 1966, pp. 181-196.

McGee, V.E., "Multidimensional Scaling of n sets of similarity measures: a nonmetric individual differences approach," Multivariate Behavioral Research, Apr. 1968, pp. 233-249.

Schiffman, Susan S. et al, "Treating Rectangular Matrices by Multidimensional Scaling," Introduction to Multidimensional Scaling, Academic Press, Orlando, 1981, pp. 321-331.

Sinha, D. and Neu, D., "A General Class of Aggregation Operators with Applications to Information Fusion in Distributed Systems," Department of Electrical Engineering and Computer Science, Stevens Institute of Technology, Hoboken, N.K., pp. 921-927.

Stevens, S.S., "On the theory of scales of measurement," Science, vol. 103, No. 2684, Jun. 7, 1946, pp. 677-680.

Takane, Y., Young, F., and deLeeuw, J., "Nonmetric individual differences multidimensional scaling: an alternating least squares method with optimal scaling features," Psychometrika, vol. 42, No. 1, Mar. 1977, pp. 7-67.

Wish, M. and Carroll, J.D., "Multidimensional scaling and its applications," in P.R. Krishnaiah and L.N. Kanal, eds., Handbook of Statistics, vol. 2, North-Holland Pub. Co., New York, 1982, pp. 317-345.

Young, M., "The organization of neural systems in the primate cerebral cortex," Biological Sciences, Proceedings of the Royal Society, 1993, vol. 252, pp. 13-18.

Zhou, Y., and Leung, H., "A linearly constrained least squares approach for multisensor data fusion," Telexis Corporation Canada, Surface Radar Section, Defence Research Establishment Ottawa, Ottawa, Ontario, Canada, SPIE vol. 3067, pp. 118-129.

* cited by examiner

FIG.3

POLYGONS
RECTANGLES □
TRIANGLES △

SIGNAL
△ SAWTOOTH
□ SQUARE
○ SINS

|   | SEQUENCES |
|---|---|
| 1 | 1,1,1,1,1,1,1,1,1,1 |
| 2 | 1,2,3,4,5,6,7,8,9,10 |
| 3 | 1,2,3,5,8,13,21,34,55,89 |
| 4 | 1,1,1,1,2,2,2,2,2,2 |
| 5 | 1,2,3,5,6,7,8,9,10,11 |
| 6 | 1,2,3,5,8,13,20,33,53,86 |
| 7 | 1,1,1,-1,1,1,1,1,1,1 |
| 8 | 1,2,3,4,-1,6,7,8,9,10 |
| 9 | 1,2,3,5,8,-1,21,34,55,89 |

TABLE I

| DIMENSION | STRESS/ENERGY |
|---|---|
| 1 | 0.16004703 |
| 2 | 0.08933938 |
| 3 | 0.00000718 |
| 4 | 0.00000232 |
| 5 | 0.00003680 |
| 6 | 0.00006358 |

TABLE 2

ENERGY MINIMIZATION FOR CLASSIFICATION, PATTERN RECOGNITION, SENSOR FUSION, DATA COMPRESSION, NETWORK RECONSTRUCTION AND SIGNAL PROCESSING

REFERENCE TO RELATED APPLICATIONS

The present patent document is a division of application Ser. No. 09/581,949, now U.S. Pat. No. 6,993,186, filed Jun. 19, 2000, which is a continuation of International Application number PCT/US98/27374, filed Dec. 23, 1998, which claims the benefit of the filing date under 35 U.S.C. § 119(e) of Provisional U.S. Patent Application Ser. 60/071,592, filed Dec. 29, 1997. All of the foregoing applications are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO APPENDIX [CD ROM/SEQUENCE LISTING]

A computer program listing appendix is included containing computer program code listings on a CD-Rom pursuant to 37 C.F.R. 1.52(e) and is hereby incorporated herein by reference in its entirety. The total number of compact discs is 1 (two duplicate copies are filed herewith). Each compact disc includes one (1) file entitled SOURCE CODE APPENDIX. Each compact disc includes 23,167 bytes. The creation date of the compact disc is Mar. 24, 2005.

BACKGROUND

The present invention relates to recognition, analysis, and classification of patterns in data from real world sources, events and processes. Patterns exist throughout the real world. Patterns also exist in the data used to represent or convey or store information about real world objects or events or processes. As information systems process more real world data, there are mounting requirements to build more sophisticated, capable and reliable pattern recognition systems.

Existing pattern recognition systems include statistical, syntactic and neural systems. Each of these systems has certain strengths which lends it to specific applications. Each of these systems has problems which limit its effectiveness.

Some real world patterns are purely statistical in nature. Statistical and probabilistic pattern recognition works by expecting data to exhibit statistical patterns. Pattern recognition by this method alone is limited. Statistical pattern recognizers cannot see beyond the expected statistical pattern. Only the expected statistical pattern can be detected.

Syntactic pattern recognizers function by expecting data to exhibit structure. While syntactic pattern recognizers are an improvement over statistical pattern recognizers, perception is still narrow and the system cannot perceive beyond the expected structures. While some real world patterns are structural in nature, the extraction of structure is unreliable.

Pattern recognition systems that rely upon neural pattern recognizers are an improvement over statistical and syntactic recognizers. Neural recognizers operate by storing training patterns as synaptic weights. Later stimulation retrieves these patterns and classifies the data. However, the fixed structure of neural pattern recognizers limits their scope of recognition. While a neural system can learn on its own, it can only find the patterns that its fixed structure allows it to see. The difficulties with this fixed structure are illustrated by the well-known problem that the number of hidden layers in a neural network strongly affects its ability to learn and generalize. Additionally, neural pattern recognition results are often not reproducible. Neural nets are also sensitive to training order, often require redundant data for training, can be slow learners and sometimes never learn. Most importantly, as with statistical and syntactic pattern recognition systems, neural pattern recognition systems are incapable of discovering truly new knowledge.

Accordingly, there is a need for an improved method and apparatus for pattern recognition, analysis, and classification which is not encumbered by preconceptions about data or models.

BRIEF SUMMARY

By way of illustration only, an analyzer/classifier process for data comprises using energy minimization with one or more input matrices. The data to be analyzed/classified is processed by an energy minimization technique such as individual differences multidimensional scaling (IDMDS) to produce at least a rate of change of stress/energy. Using the rate of change of stress/energy and possibly other IDMDS output, the data are analyzed or classified through patterns recognized within the data. The foregoing discussion of one embodiment has been presented only by way of introduction. Nothing in this section should be taken as a limitation on the following claims, which define the scope of the invention.

BRIEF DESCRIPTION OF THE DRAWINGS

FIG. 2 through FIG. 10 relate to examples illustrating use of an embodiment of the invention for data classification, pattern recognition, and signal processing.

DETAILED DESCRIPTION OF THE PRESENTLY PREFERRED EMBODIMENTS

Figure 1:
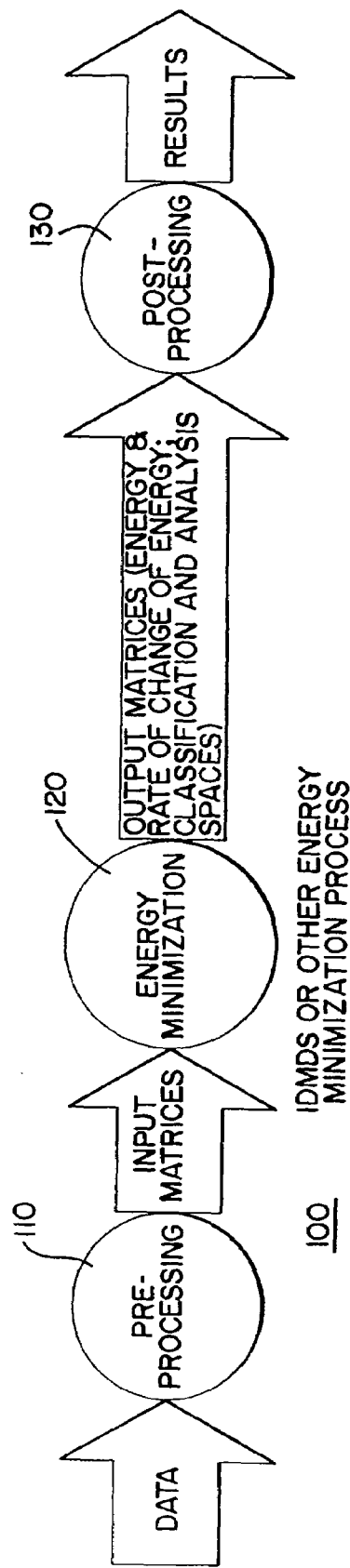
FIG. 1 is a diagram illustrating components of an analyzer according to the first embodiment of the invention.

The method and apparatus in accordance with the present invention provide an analysis tool with many applications. This tool can be used for data classification, pattern recognition, signal processing, sensor fusion, data compression, network reconstruction, and many other purposes. The invention relates to a general method for data analysis based on energy minimization and least energy deformations. The invention uses energy minimization principles to analyze one to many data sets. As used herein, energy is a convenient descriptor for concepts which are handled similarly mathematically. Generally, the physical concept of energy is not intended by use of this term but the more general mathematical concept. Within multiple data sets, individual data sets are characterized by their deformation under least energy merging. This is a contextual characterization which allows the invention to exhibit integrated unsupervised learning and generalization. A number of methods for producing energy minimization and least energy merging and extraction of deformation information have been identified; these include, the finite element method (FEM), simulated annealing, and individual differences multidimensional scaling (IDMDS). The presently preferred embodiment of the invention utilizes individual differences multidimensional scaling (IDMDS).

Multidimensional scaling (MDS) is a class of automated, numerical techniques for converting proximity data into geometric data. IDMDS is a generalization of MDS, which converts multiple sources of proximity data into a common geometric configuration space, called the common space, and an associated vector space called the source space. Elements of the source space encode deformations of the common space specific to each source of proximity data. MDS and IDMDS were developed for psychometric research, but are now standard tools in many statistical software packages. MDS and IDMDS are often described as data visualization techniques. This description emphasizes only one aspect of these algorithms.

Broadly, the goal of MDS and IDMDS is to represent proximity data in a low dimensional metric space. This has been expressed mathematically by others (see, for example, de Leeuw, J. and Heiser, W., "Theory of multidimensional scaling," in P. R. Krishnaiah and L. N. Kanal, eds., *Handbook of Statistics*, Vol. 2. North-Holland, New York, 1982) as follows. Let S be a nonempty finite set, p a real valued function on S×S, p: S×S→R.

p is a measure of proximity between objects in S. Then the goal of MDS is to construct a mapping $\tilde{f}$ from S into a metric space (X, d), $\tilde{f}$: S→X, such that $p(i,j)=p_{ij} \approx d(\tilde{f}(i),\tilde{f}(j))$, that is, such that the proximity of object i to object j in S is approximated by the distance in X between $\tilde{f}(i)$ and $\tilde{f}(j)$. X is usually assumed to be n dimensional Euclidean space $R^n$, with n sufficiently small.

IDMDS generalizes MDS by allowing multiple sources. For k=1, . . . , m let $S_k$ be a finite set with proximity measure $p_k$, then IDMDS constructs maps $\tilde{f}_k$: $S_k \rightarrow X$ such that $p_k(i, j)=p_{ijk} \approx d(\tilde{f}_k(i),\tilde{f}_k(j))$, for k=1, . . . , m.

Intuitively, IDMDS is a method for representing many points of view. The different proximities $p_k$ can be viewed as giving the proximity perceptions of different judges. IDMDS accommodates these different points of view by finding different maps $\tilde{f}_k$ for each judge. These individual maps, or their image configurations, are deformations of a common configuration space whose interpoint distances represent the common or merged point of view.

MDS and IDMDS can equivalently be described in terms of transformation functions. Let $P=(p_{ij})$ be the matrix defined by the proximity p on S×S. Then MDS defines a transformation function $f: p_{ij} \mapsto d_{ij}(X)$, where $d_{ij}(X)=d(\tilde{f}(i),\tilde{f}(j))$, with $\tilde{f}$ the mapping from S→X induced by the transformation function f. Here, by abuse of notation, $X=\tilde{f}(S)$, also denotes the image of S under $\tilde{f}$. The transformation function f should be optimal in the sense that the distances $f(p_{ij})$ give the best approximation to the proximities $P_{ij}$. This optimization criterion is described in more detail below. IDMDS is similarly re-expressed; the single transformation f is replaced by m transformations $f_k$. Note, these $f_k$ need not be distinct. In the following, the image of $S_k$ under $f_k$ will be written $X_k$.

MDS and IDMDS can be further broken down into so-called metric and nonmetric versions. In metric MDS or IDMDS, the transformations $f(f_k)$ are parametric functions of the proximities $p_{ij}(p_{ijk})$. Nonmetric MDS or IDMDS generalizes the metric approach by allowing arbitrary admissible transformations $f$ ($f_k$), where admissible means the association between proximities and transformed proximities (also called disparities in this context) is weakly monotone:

$p_{ij} < p_{kl}$ implies $f(p_{ij}) \leq f(p_{kl})$.

Beyond the metric-nonmetric distinction, algorithms for MDS and IDMDS are distinguished by their optimization criteria and numerical optimization routines. One particularly elegant and publicly available IDMDS algorithm is PROXSCAL See Commandeur, J. and Heiser, W., "Mathematical derivations in the proximity scaling (PROXSCAL) of symmetric data matrices," *Tech. report no. RR*-93-03, Department of Data Theory, Leiden University, Leiden, The Netherlands. PROXSCAL is a least squares, constrained majorization algorithm for IDMDS. We now summarize this algorithm, following closely the above reference.

PROXSCAL is a least squares approach to IDMDS which minimizes the objective function $$\sigma(f_1, \ldots, f_m, X_1, \ldots, X_m) = \sum_{k=1}^{m} \sum_{i<j}^{n} w_{ijk}(f_k(p_{ijk}) - d_{ij}(X_k))^2.$$

σ is called the stress and measures the goodness-of-fit of the configuration distances $d_{ij}(X_k)$ to the transformed proximities $f_k(p_{ijk})$. This is the most general form for the objective function. MDS can be interpreted as an energy minimization process and stress can be interpreted as an energy functional. The $w_{ijk}$ are proximity weights. For simplicity, it is assumed in what follows that $w_{ijk}=1$ for all i, j, k.

The PROXSCAL majorization algorithm for MDS with transformations is summarized as follows.

1. Choose a (possibly random) initial configuration $X^0$.
2. Find optimal transformations $f(p_{ij})$ for fixed distances $d_{ij}(X^0)$.
3. Compute the initial stress $$\sigma(f, X^0) = \sum_{i<j}^{n} (f(p_{ij}) - d_{ij}(X^0))^2.$$

4. Compute the Guttman transform $\overline{X}$ of $X^0$ with the transformed proximities $f(p_{ij})$. This is the majorization step.
5. Replace $X^0$ with $\overline{X}$ and find optimal transformations $f(p_{ij})$ for fixed distances $d_{ij}(X^0)$.
6. Compute $\sigma(f,X^0)$.
7. Go to step 4 if the difference between the current and previous stress is not less than ε, some previously defined number. Stop otherwise.

For multiple sources of proximity data, restrictions are imposed on the configurations $X_k$ associated to each source of proximity data in the form of the constraint equation $X_k=ZW_k$.

This equation defines a common configuration space Z and diagonal weight matrices $W_k$. Z represents a merged or common version of the input sources, while the $W_k$ define the deformation of the common space required to produce the individual configurations $X_k$. The vectors defined by diag($W_k$), the diagonal entries of the weight matrices $W_k$, form the source space W associated to the common space Z.

The PROXSCAL constrained majorization algorithm for IDMDS with transformations is summarized as follows. To simplify the discussion, so-called unconditional IDMDS is described. This means the m transformation functions are the same: $f_1 = f_2 = \ldots = f_m$.

1. Choose constrained initial configurations $X_k^0$.
2. Find optimal transformations $f(p_{ijk})$ for fixed distances $d_{ij}(X_k^0)$.
3. Compute the initial stress $$\sigma(f, X_1^0, \ldots, X_m^0) = \sum_{k=1}^{m} \sum_{i<j}^{n} (f(p_{ijk}) - d_{ij}(X_k^0))^2.$$

4. Compute unconstrained updates $\overline{X}_k$ of $X_k^0$ using the Guttman transform with transformed proximities $f(p_{ijk})$. This is the unconstrained majorization step.
5. Solve the metric projection problem by finding $X_k^+$ minimizing $$h(X_1, \ldots, X_m) = \sum_{k=1}^{m} tr(X_k - \overline{X}_k)^t (X_k - \overline{X}_k)$$

subject to the constraints $X_k = ZW_k$. This step constrains the updated configurations from step 4.

6. Replace $X_k^0$ with $X_k^+$ and find optimal transformations $f(p_{ijk})$ for fixed distances $d_{ij}(X_k^0)$.
7. Compute $\sigma(f, X_1^0, \ldots, X_m^0)$
8. Go to step 4 if the difference between the current and previous stress is not less than $\epsilon$, some previously defined number. Stop otherwise.

Here, tr(A) and $A^t$ denote, respectively, the trace and transpose of matrix A.

It should be pointed out that other IDMDS routines do not contain an explicit constraint condition. For example, ALSCAL (see Takane, Y., Young, F, and de Leeuw, J., "Nonmetric individual differences multidimensional scaling: an alternating least squares method with optimal scaling features," *Psychometrika*, Vol. 42, 1977) minimizes a different energy expression (sstress) over transformations, configurations, and weighted Euclidean metrics. ALSCAL also produces common and source spaces, but these spaces are computed through alternating least squares without explicit use of constraints. Either form of IDMDS can be used in the present invention.

MDS and IDMDS have proven useful for many kinds of analyses. However, it is believed that prior utilizations of these techniques have not extended the use of these techniques to further possible uses for which MDS and IDMDS have particular utility and provide exceptional results. Accordingly, one benefit of the present invention is to incorporate MDS or IDMDS as part of a platform in which aspects of these techniques are extended. A further benefit is to provide an analysis technique, part of which uses IDMDS, that has utility as an analytic engine applicable to problems in classification, pattern recognition, signal processing, sensor fusion, and data compression, as well as many other kinds of data analytic applications.

Referring now to FIG. 1, it illustrates an operational block diagram of a data analysis/classifier tool 100. The least energy deformation analyzer/classifier is a three-step process. Step 110 is a front end for data transformation. Step 120 is a process step implementing energy minimization and deformation computations—in the presently preferred embodiment, this process step is implemented through the IDMDS algorithm. Step 130 is a back end which interprets or decodes the output of the process step 120. These three steps are illustrated in FIG. 1.

It is to be understood that the steps forming the tool 100 may be implemented in a computer usable medium or in a computer system as computer executable software code. In such an embodiment, step 110 may be configured as a code, step 120 may be configured as second code and step 120 may be configured as third code, with each code comprising a plurality of machine readable steps or operations for performing the specified operations. While step 110, step 120 and step 130 have been shown as three separate elements, their functionality can be combined and/or distributed. It is to be further understood that "medium" is intended to broadly include any suitable medium, including analog or digital, hardware or software, now in use or developed in the future.

Step 110 of the tool 100 is the transformation of the data into matrix form. The only constraint on this transformation for the illustrated embodiment is that the resulting matrices be square. The type of transformation used depends on the data to be processed and the goal of the analysis. In particular, it is not required that the matrices be proximity matrices in the traditional sense associated with IDMDS. For example, time series and other sequential data may be transformed into source matrices through straight substitution into entries of symmetric matrices of sufficient dimensionality (this transformation will be discussed in more detail in an example below). Time series or other signal processing data may also be Fourier or otherwise analyzed and then transformed to matrix form.

Step 120 of the tool 100 implements energy minimization and extraction of deformation information through IDMDS. In the IDMDS embodiment of the tool 100, the stress function σ defines an energy functional over configurations and transformations. The configurations are further restricted to those which satisfy the constraint equations $X_k = ZW_k$. For each configuration $X_k$, the weight vectors diag($W_k$) are the contextual signature, with respect to the common space, of the k-th input source. Interpretation of σ as an energy functional is fundamental; it greatly expands the applicability of MDS as an energy minimization engine for data classification and analysis.

Step 130 consists of both visual and analytic methods for decoding and interpreting the source space W from step 120. Unlike traditional applications of IDMDS, tool 100 often produces high dimensional output. Among other things, this makes visual interpretation and decoding of the source space problematic. Possible analytic methods for understanding the high dimensional spaces include, but are not limited to, linear programming techniques for hyperplane and decision surface estimation, cluster analysis techniques, and generalized gravitational model computations. A source space dye-dropping or tracer technique has been developed for both source space visualization and analytic postprocessing. Step 130 may also consist in recording stress/energy, or the rate of change of stress/energy, over multiple dimensions. The graph of energy (rate or change or stress/energy) against dimension can be used to determine network and dynamical system dimensionality. The graph of stress/energy against dimensionality is traditionally called a scree plot. The use and purpose of the scree plot is greatly extended in the present embodiment of the tool 100.

Let $S=\{S_k\}$ be a collection of data sets or sources $S_k$ for $k=1, \ldots, m$. Step 110 of the tool 100 converts each $S_k \in S$ to matrix form $M(S_k)$ where $M(S_k)$ is a p dimensional real hollow symmetric matrix. Hollow means the diagonal entries of $M(S_k)$ are zero. As indicated above, $M(S_k)$ need not be symmetric or hollow, but for simplicity of exposition these additional restrictions are adopted. Note also that the matrix dimensionality p is a function of the data S and the goal of the analysis. Since $M(S_k)$ is hollow symmetric, it can be interpreted and processed in IDMDS as a proximity (dissimilarity) matrix. Step 110 can be represented by the map $$M:S \rightarrow H^p(R),$$

$$S_k \mapsto M(S_k)$$

where $H^p(R)$ is the set of p dimensional hollow real symmetric matrices. The precise rule for computing M depends on the type of data in S, and the purpose of the analysis. For example, if S contains time series data, then M might entail the straightforward entry-wise encoding mentioned above. If S consists of optical character recognition data, or some other kind of geometric data, then $M(S_k)$ may be a standard distance matrix whose ij-th entry is the Euclidean distance between "on" pixels i and j. M can also be combined with other transformations to form the composite, $(M \circ F)(S_k)$, where F, for example, is a fast Fourier transform (FFT) on signal data $S_k$. To make this more concrete, in the examples below M will be explicitly calculated in a number of different ways. It should also be pointed out that for certain data collections S it is possible to analyze the conjugate or transpose $S^t$ of S. For instance, in data mining applications, it is useful to transpose records (clients) and fields (client attributes) thus allowing analysis of attributes as well as clients. The mapping M is simply applied to the transposed data.

Step 120 of the presently preferred embodiment of the tool 100 is the application of IDMDS to the set of input matrices $M(S)=\{M(S_k)\}$. Each $M(S_k) \in M(S)$ is an input source for IDMDS. As described above, the IDMDS output is a common space $Z \subset R^n$ and a source space W. The dimensionality n of these spaces depends on the input data S and the goal of the analysis. For signal data, it is often useful to set $n=p-1$ or even $n=|S_k|$ where $|S_k|$ denotes the cardinality of $S_k$. For data compression, low dimensional output spaces are essential. In the case of network reconstruction, system dimensionality is discovered by the invention itself.

IDMDS can be thought of as a constrained energy minimization process. As discussed above, the stress σ is an energy functional defined over transformations and configurations in $R^n$; the constraints are defined by the constraint equation $X_k=ZW_k$. IDMDS attempts to find the lowest stress or energy configurations $X_k$ which also satisfy the constraint equation. (MDS is the special case when each $W_k=I$, the identity matrix.) Configurations $X_k$ most similar to the source matrices $M(S_k)$ have the lowest energy. At the same time, each $X_k$ is required to match the common space Z up to deformation defined by the weight matrices $W_k$. The common space serves as a characteristic, or reference object. Differences between individual configurations are expressed in terms of this characteristic object with these differences encoded in the weight matrices $W_k$. The deformation information contained in the weight matrices, or, equivalently, in the weight vectors defined by their diagonal entries, becomes the signature of the configurations $X_k$ and hence the sources $S_k$ (through $M(S_k)$). The source space may be thought of as a signature classification space.

The weight space signatures are contextual; they are defined with respect to the reference object Z. The contextual nature of the source deformation signature is fundamental. As the polygon classification example below will show, Z-contextuality of the signature allows the tool 100 to display integrated unsupervised machine learning and generalization. The analyzer/classifier learns seamlessly and invisibly. Z-contextuality also allows the tool 100 to operate without a priori data models. The analyzer/classifier constructs its own model of the data, the common space Z.

Step 130, the back end of the tool 100, decodes and interprets the source or classification space output W from IDMDS. Since this output can be high dimensional, visualization techniques must be supplemented by analytic methods of interpretation. A dye-dropping or tracer technique has been developed for both visual and analytic postprocessing. This entails differential marking or coloring of source space output. The specification of the dye-dropping is contingent upon the data and overall analysis goals. For example, dye-dropping may be two-color or binary allowing separating hyperplanes to be visually or analytically determined. For an analytic approach to separating hyperplanes using binary dye-dropping see Bosch, R. and Smith, J, "Separating hyperplanes and the authorship of the disputed federalist papers," *American Mathematical Monthly*, Vol. 105, 1998. Discrete dye-dropping allows the definition of generalized gravitational clustering measures of the form $$g_P(A, x) = \frac{\sum_{y \neq x} \chi_A(x) \exp(p \cdot d(x, y))}{\sum_{y \neq x} \exp(p \cdot d(x, y))}.$$

Here, A denotes a subset of W (indicated by dye-dropping), $\chi_A(x)$, is the characteristic function on A, $d(\cdot,\cdot)$ is a distance function, and $p \in R$. Such measures may be useful for estimating missing values in data bases. Dye-dropping can be defined continuously, as well, producing a kind of height function on W. This allows the definition of decision surfaces or volumetric discriminators. The source space W is also analyzable using standard cluster analytic techniques. The precise clustering metric depends on the specifications and conditions of the IDMDS analysis in question.

Finally, as mentioned earlier, the stress/energy and rate of change of stress/energy can be used as postprocessing tools. Minima or kinks in a plot of energy, or the rate of change of energy, over dimension can be used to determine the dimensionality of complex networks and general dynamical systems for which only partial output information is available. In fact, this technique allows dimensionality to be inferred often from only a single data stream of time series of observed data.

A number of examples are presented below to illustrate the method and apparatus in accordance with the present invention. These examples-are illustrative only and in no way limit the scope of the method or apparatus.

EXAMPLE A

Classification of Regular Polygons

The goal of this experiment was to classify a set of regular polygons. The collection $S=\{S_1, \ldots, S_{16}\}$ with data sets $S_1$–$S_4$, equilateral triangles; $S_5$–$S_8$, squares; $S_9$–$S_{12}$, pentagons; and $S_{13}$–$S_{16}$; hexagons. Within each subset of distinct polygons, the size of the figures is increasing with the subscript. The perimeter of each polygon $S_k$ was divided into 60 equal segments with the segment endpoints ordered clockwise from a fixed initial endpoint. A turtle application was then applied to each polygon to compute the Euclidean distance from each segment endpoint to every other segment endpoint (initial endpoint included). Let $x_{S_k}^i$ denote the i-th endpoint of polygon $S_k$, then the mapping M is defined by $$M: S \to H^{60}(R),$$

$$S_k \mapsto [d_{S_k}^1 | d_{S_k}^2 | \ldots | d_{S_k}^{60}]$$

where the columns $$d_{S_k}^i = (d(x_{S_k}^i, x_{S_k}^1), d(x_{S_k}^i, x_{S_k}^2), \ldots, d(x_{S_k}^i, x_{S_k}^{60}))^t.$$

The individual column vectors $d_{S_k}^i$ have intrinsic interest. When plotted as functions of arc length they represent a geometric signal which contains both frequency and spatial information.

The 16, 60×60 distance matrices were input into a publicly distributed version of PROXSCAL. PROXSCAL was run with the following technical specifications: sources—16, objects—60, dimension—4, model—weighted, initial configuration—Torgerson, conditionality—unconditional, transformations—numerical, rate of convergence—0.0, number of iterations—500, and minimum stress—0.0.

Figure 2:
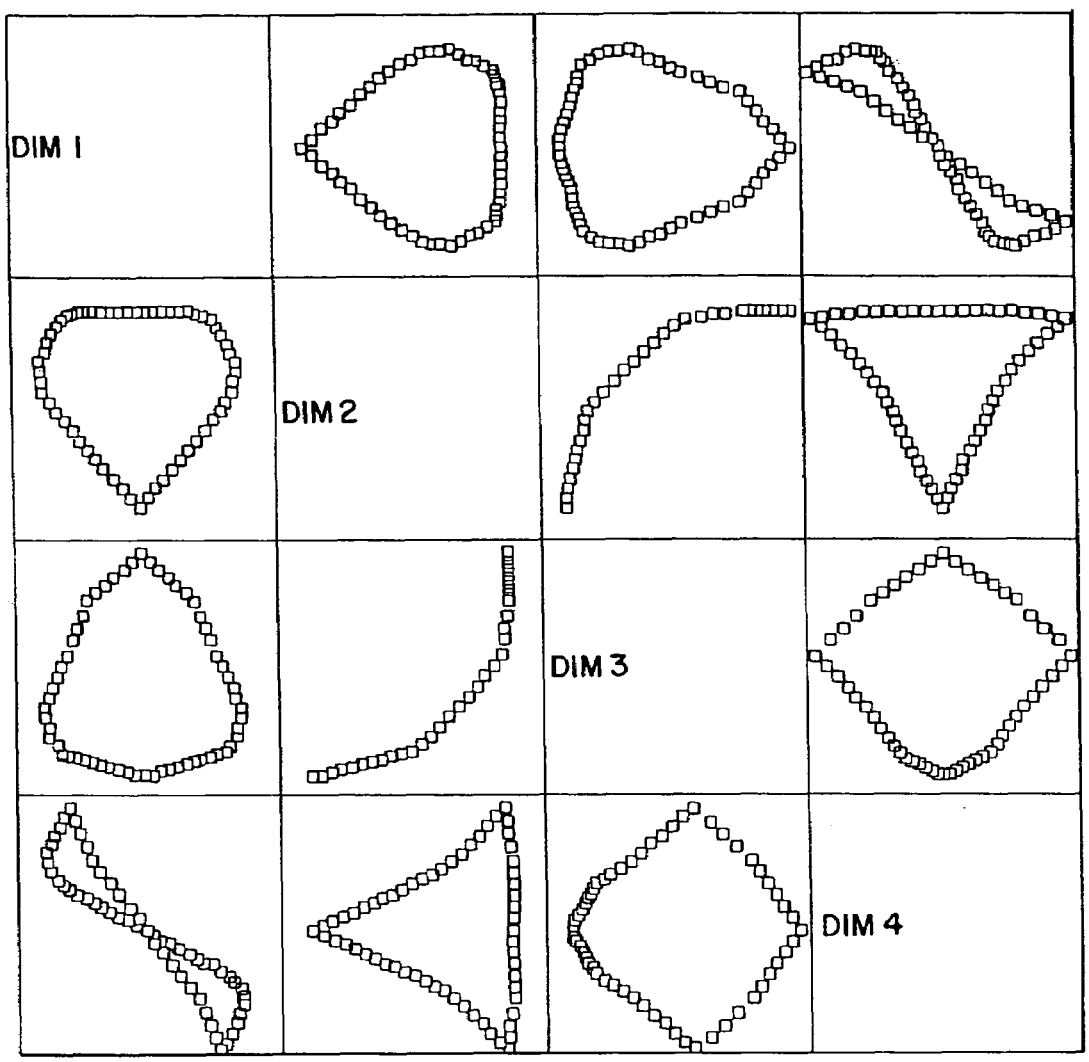
Figure 3:
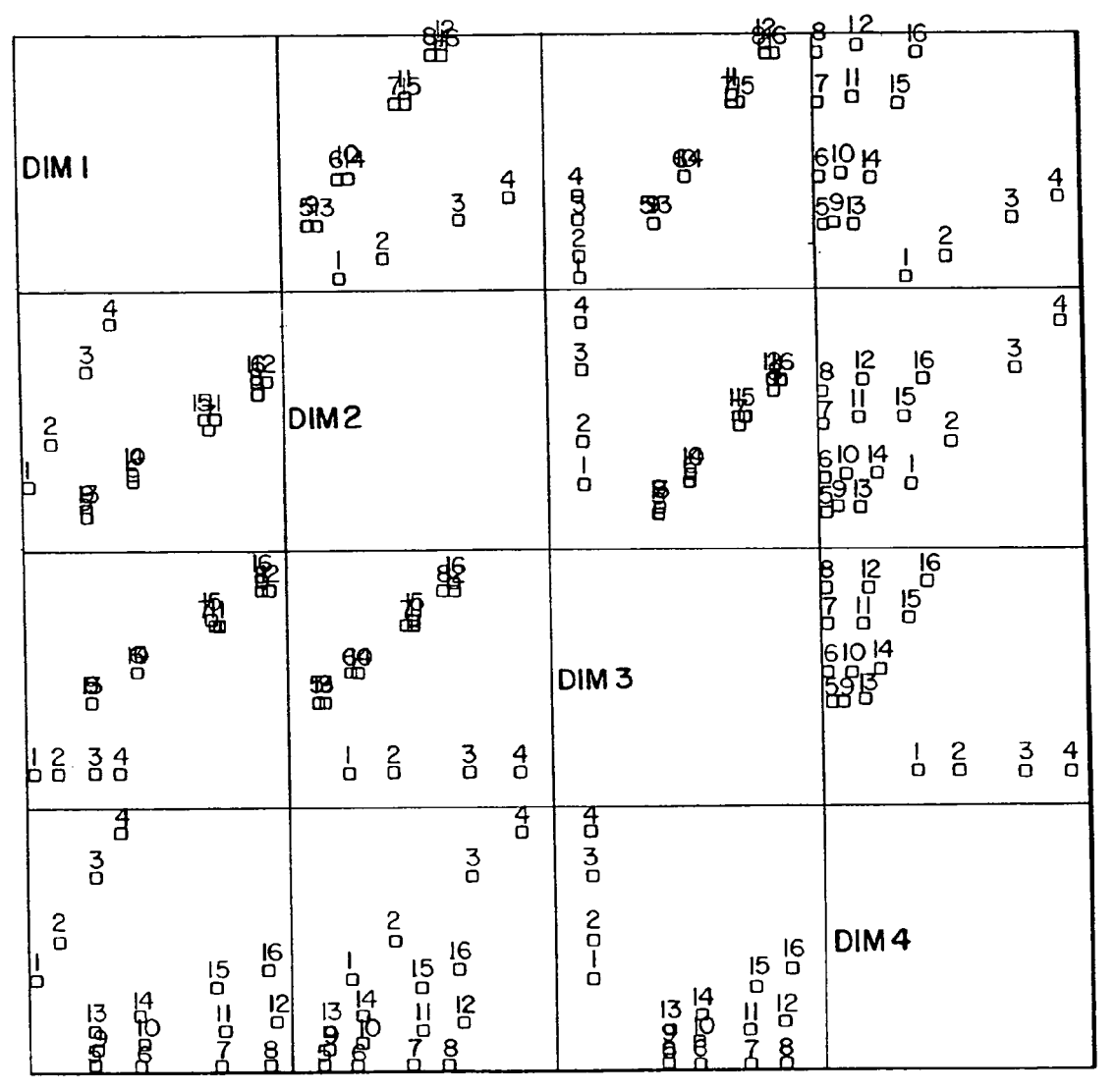

FIG. 2 and FIG. 3 show the four dimensional common and source space output. The common space configuration appears to be a multifaceted representation of the original polygons. It forms a simple closed path in four dimensions which, when viewed from different angles, or, what is essentially the same thing, when deformed by the weight matrices, produces a best, in the sense of minimal energy, representation of each of the two dimensional polygonal figures. The most successful such representation appears to be that of the triangle projected onto the plane determined by dimensions 2 and 4.

In the source space, the different types of polygons are arranged, and hence, classified, along different radii. Magnitudes within each such radial classification indicate polygon size or scale with the smaller polygons located nearer the origin.

The contextual nature of the polygon classification is embodied in the common space configuration. Intuitively, this configuration looks like a single, carefully bent wire loop. When viewed from different angles, as encoded by the source space vectors, this loop of wire looks variously like a triangle, a square, a pentagon, or a hexagon.

EXAMPLE B

Classification of Non-Regular Polygons

The polygons in Example A were regular. In this example, irregular polygons $S=\{S_1, \ldots, S_6\}$ are considered, where $S_1$–$S_3$ are triangles and $S_4$–$S_6$ rectangles. The perimeter of each figure $S_k$ was divided into 30 equal segments with the preprocessing transformation M computed as in Example A. This produced 6, 30×30 source matrices which were input into PROXSCAL with technical specifications the same as those above except for the number of sources, 6, and objects, 30.

Figure 4:
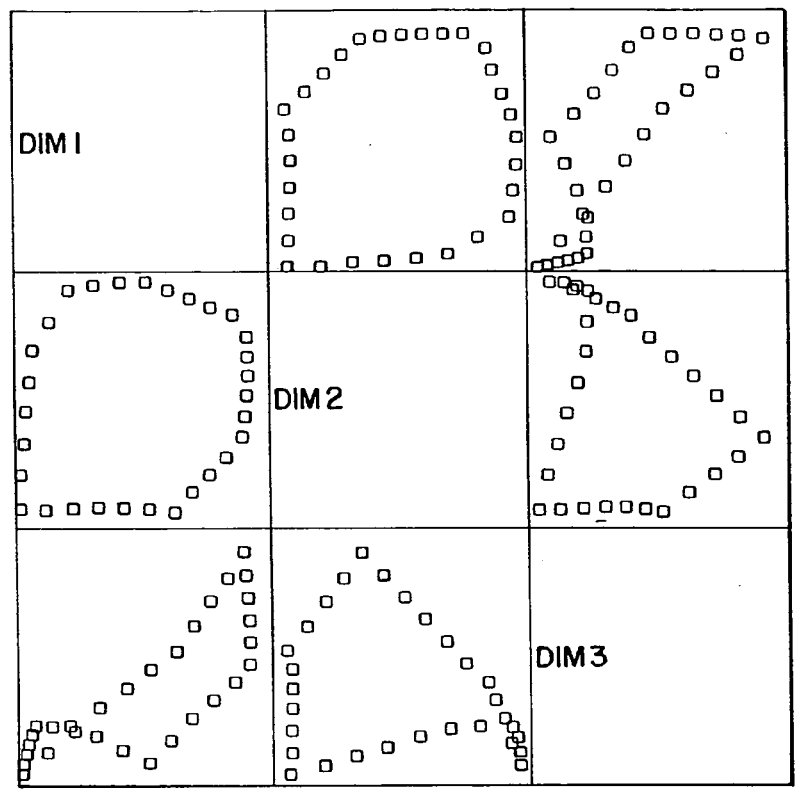
Figure 5:
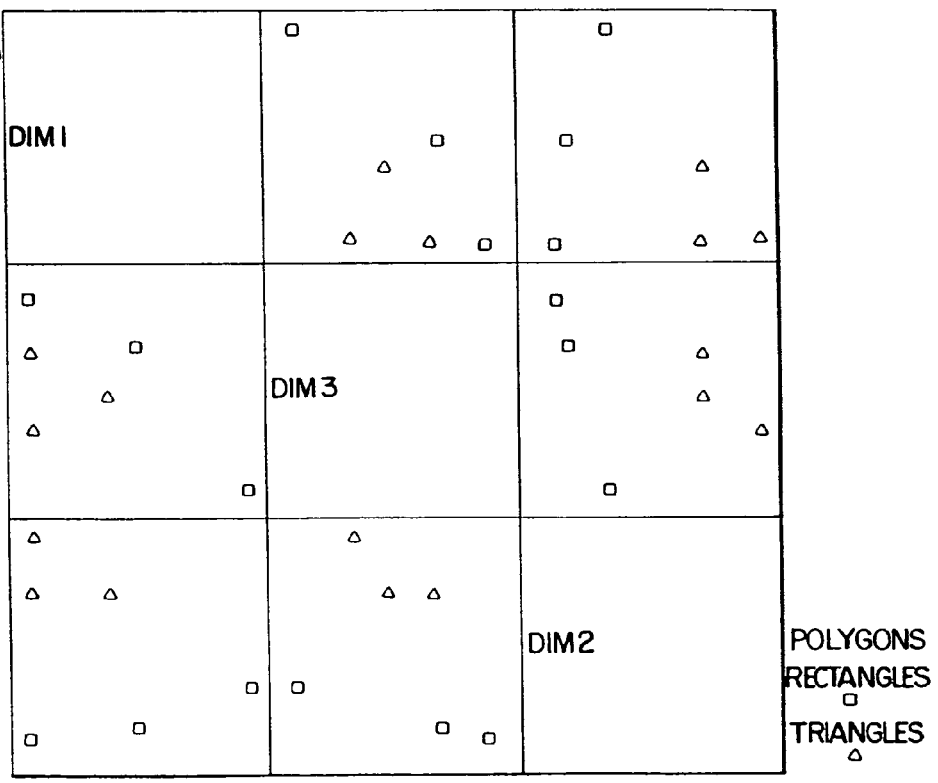

FIG. 4 and FIG. 5 show the three dimensional common and source space outputs. The common space configuration, again, has a "holographic" or faceted quality; when illuminated from different angles, it represents each of the polygonal figures. As before, this change of viewpoint is encoded in the source space weight vectors. While the weight vectors encoding triangles and rectangles are no longer radially arranged, they can clearly be separated by a hyperplane and are thus accurately classified by the analysis tool as presently embodied.

It is notable that two dimensional IDMDS outputs were not sufficient to classify these polygons in the sense that source space separating hyperplanes did not exist in two dimensions.

EXAMPLE C

Time Series Data

This example relates to signal processing and demonstrates the analysis tool's invariance with respect to phase and frequency modification of time series data. It also demonstrates an entry-wise approach to computing the preprocessing transformation M.

The set $S=\{S_1, \ldots, S_{12}\}$ consisted of sine, square, and sawtooth waveforms. Four versions of each waveform were included, each modified for frequency and phase content. Indices 1–4 indicate sine, 5–8 square, and 9–12 sawtooth frequency and phase modified waveforms. All signals had unit amplitude and were sampled at 32 equal intervals x for $0 \leq x \leq 2\pi$.

Each time series $S_k$ was mapped into a symmetric matrix as follows. First, an "empty" nine dimensional, lower triangular matrix $T_k=(t_{ij}^k)=T(S_k)$ was created. "Empty" meant that $T_k$ had no entries below the diagonal and zeros everywhere else. Nine dimensions were chosen since nine is the smallest positive integer m satisfying the inequality $m(m-1)/2 \geq 32$ and $m(m-1)/2$ is the number of entries below the diagonal in an m dimensional matrix. The empty entries in $T_k$ were then filled in, from upper left to lower right, column by column, by reading in the time series data from $S_k$. Explicitly: $s_1^k=t_{21}^k$, the first sample in $S_k$ was written in the second row, first column of $T_k$; $s_2^k=t_{31}^k$, the second sample in $S_k$ was written in the third row, first column of $T_k$, and so on. Since there were only 32 signal samples for 36 empty slots in $T_k$, the four remaining entries were designated missing by writing −2 in these positions (These entries are then ignored when calculating the stress). Finally, a hollow symmetric matrix was defined by setting $$M(S_k)=T_k+T_k^t.$$

This preprocessing produced 12, 9×9 source matrices which were input to PROXSCAL with the following technical specifications: sources—12, objects—9, dimension—8, model—weighted, initial configuration—Torgerson, conditionality—unconditional, transformations—ordinal, approach to ties—secondary, rate of convergence—0.0, number of iterations—500, and minimum stress—0.0. Note that the data, while metric or numeric, was transformed as if it were ordinal or nonmetric. The use of nonmetric IDMDS has been greatly extended in the present embodiment of the tool 100.

Figure 6:
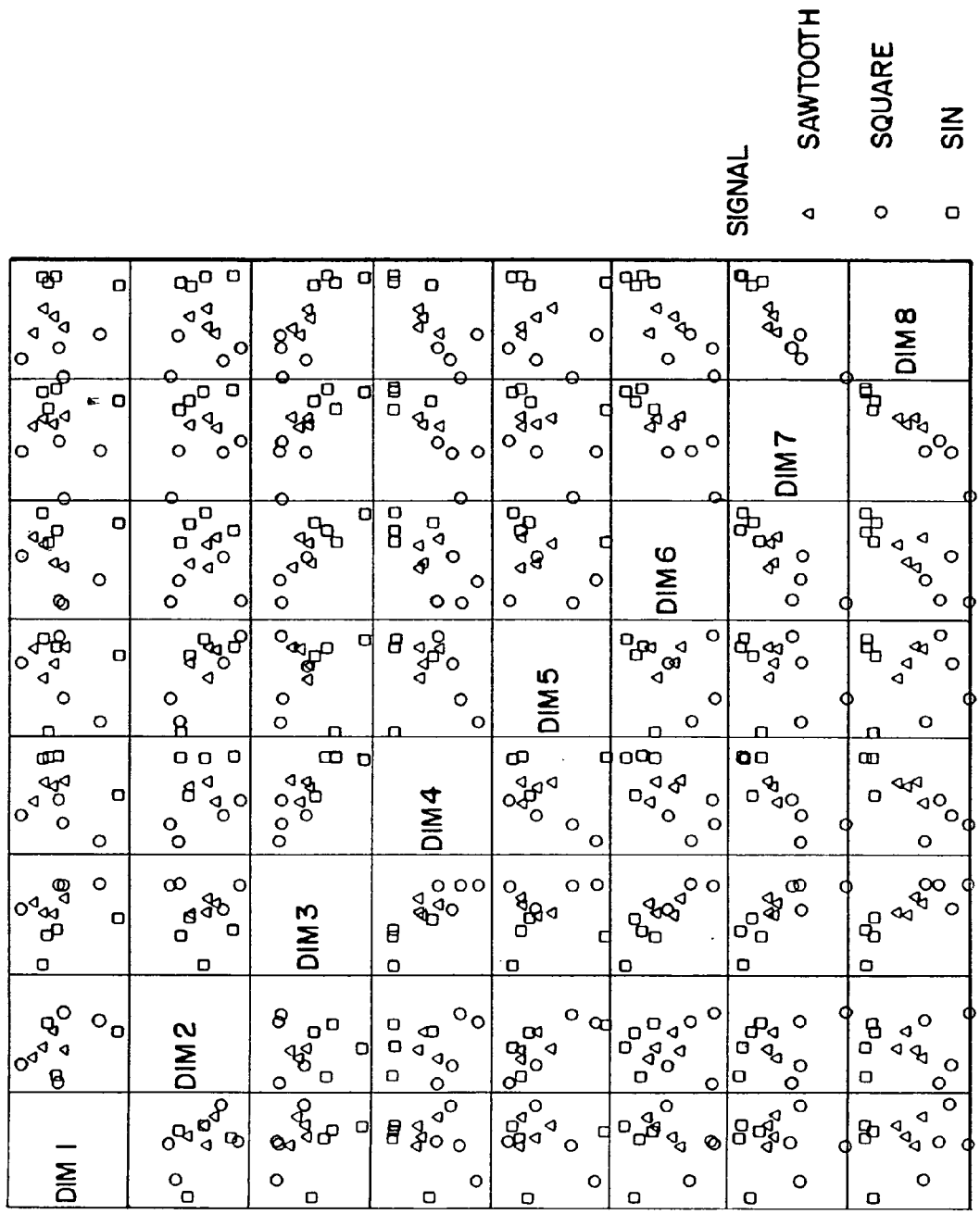

FIG. 6 shows the eight dimensional source space output for the time series data. The projection in dimensions seven and eight, as detailed in FIG. 7, shows the input signals are separated by hyperplanes into sine, square, and sawtooth waveform classes independent of the frequency or phase content of the signals.

EXAMPLE D

Sequences, Fibonacci, etc.

Figures 7, 8:
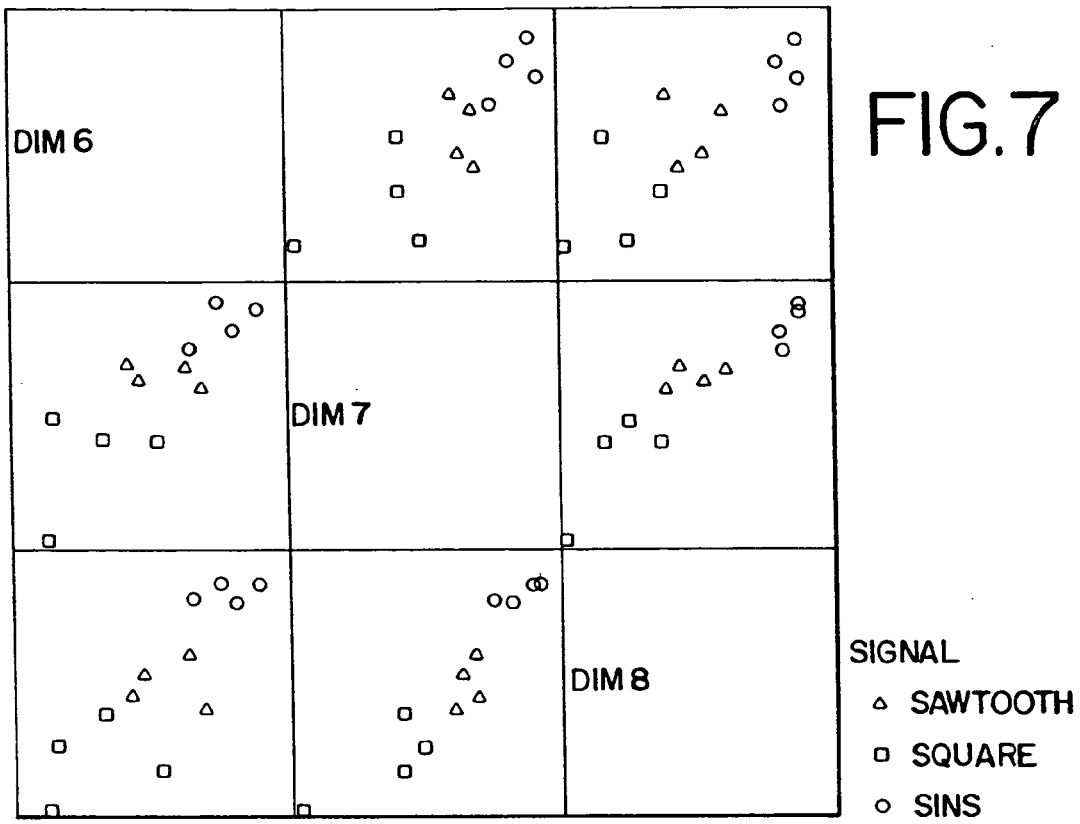

The data set $S=\{S_1, \ldots, S_9\}$ in this example consisted of nine sequences with ten elements each; they are shown in Table 1, FIG. 8. Sequences 1–3 are constant, arithmetic, and Fibonacci sequences respectively. Sequences 4–6 are these same sequences with some error or noise introduced. Sequences 7–9 are the same as 1–3, but the negative 1's indicate that these elements are missing or unknown.

The nine source matrices $M(S_k)=(m_{ij}^k)$ were defined by $$m_{ij}^k = |s_i^k - s_j^k|,$$

the absolute value of the difference of the i-th and j-th elements in sequence $S_k$. The resulting 10×10 source matrices where input to PROXSCAL configured as follows: sources—9, objects—10, dimension—8, model—weighted, initial configuration—simplex, conditionality—unconditional, transformations—numerical, rate of convergence—0.0, number of iterations—500, and minimum stress—0.0.

Figures 9, 10:
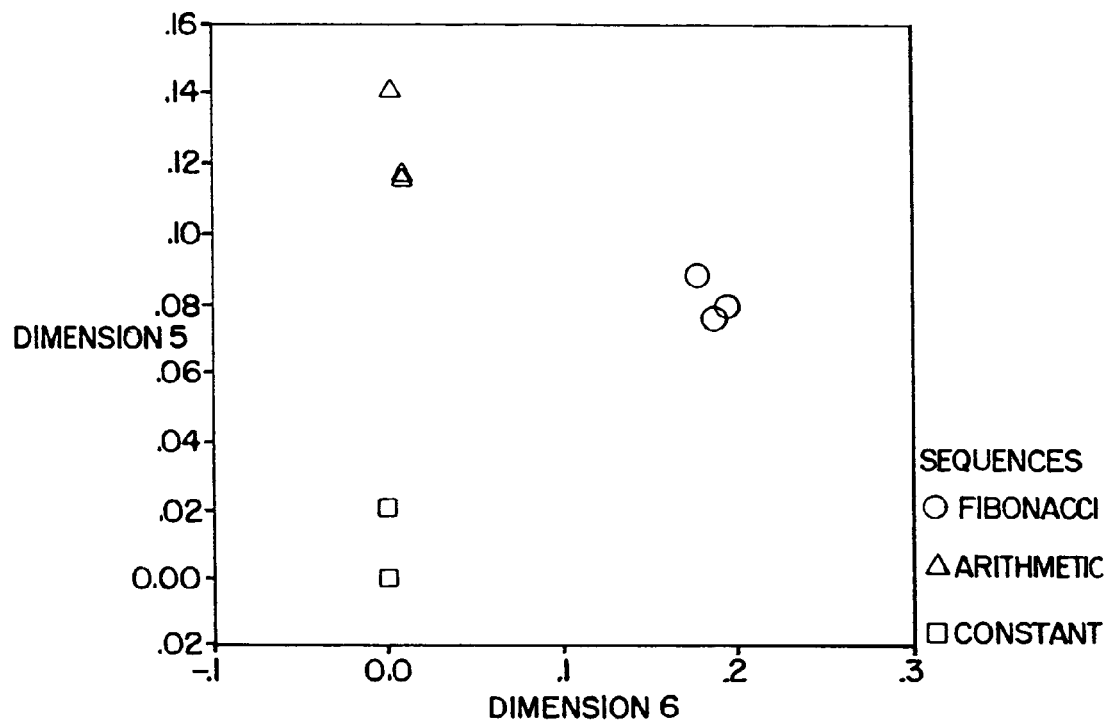

FIG. 9 shows dimensions 5 and 6 of the eight dimensional source space output. The sequences are clustered, hence classified, according to whether they are constant, arithmetic, or Fibonacci based. Note that in this projection, the constant sequence and the constant sequence with missing element coincide, therefore only two versions of the constant sequence are visible. This result demonstrates that the tool 100 of the presently preferred embodiment can function on noisy or error containing, partially known, sequential data sets.

EXAMPLE E

Missing Value Estimation For Bridges

This example extends the previous result to demonstrate the applicability of the analysis tool to missing value estimation on noisy, real-world data. The data set consisted of nine categories of bridge data from the National Bridge Inventory (NBI) of the Federal Highway Administration. One of these categories, bridge material (steel or concrete), was removed from the database. The goal was to repopulate this missing category using the technique of the presently preferred embodiment to estimate the missing values.

One hundred bridges were arbitrarily chosen from the NBI. Each bridge defined an eight dimensional vector of data with components the NBI categories. These vectors were preprocessed as in Example D, creating one hundred 8×8 source matrices. The matrices were submitted to PROXSCAL with specifications: sources—100, objects—8, dimension—7, model—weighted, initial configuration—simplex, conditionality—unconditional, transformations—numerical, rate of convergence—0.0, number of iterations—500, and minimum stress—0.00001.

The seven dimensional source space output was partially labeled by bridge material—an application of dye-dropping—and analyzed using the following function $$g_p(A_i, x) = \frac{\sum_{y \neq x} \chi_{A_i}(x) \cdot d(x,y)^{-p}}{\sum_{y \neq x} d(x,y)^{-p}}$$

where p is an empirically determined negative number, d(x,y) is Euclidean distance on the source space, and $\chi_{A_i}$ is the characteristic function on material set $A_i$, i=1,2, where $A_1$ is steel, $A_2$ concrete. (For the bridge data, no two bridges had the same source space coordinates, hence $g_p$ was well-defined.) A bridge was determined to be steel (concrete) if $g_p(A_1, x) > g_p(A_2, x)$ ($g_p(A_1, x) < g_p(A_2, x)$). The result was indeterminate in case of equality.

The tool 100 illustrated in FIG. 1 estimated bridge construction material with 90 percent accuracy.

EXAMPLE F

Network Dimensionality For a 4-Node Network

This example demonstrates the use of stress/energy minima to determine network dimensionality from partial network output data. Dimensionality, in this example, means the number of nodes in a network.

A four-node network was constructed as follows: generator nodes 1 to 3 were defined by the sine functions, sin(2x), sin(2x+π/2), and sin(2x+4π/3); node 4 was the sum of nodes 1 through 3. The output of node 4 was sampled at 32 equal intervals between 0 and 2π.

The data from node 4 was preprocessed in the manner of Example D: the ij-th entry of the source matrix for node 4 was defined to be the absolute value of the difference between the i-th and j-th samples of the node 4 time series. A second, reference, source matrix was defined using the same preprocessing technique, now applied to thirty two equal interval samples of the function sin(x) for $0 \leq x \leq 2\pi$. The resulting 2, 32×32 source matrices were input to PROXSCAL with technical specification: sources—2, objects—32, dimension—1 to 6, model—weighted, initial configuration—simplex, conditionality—conditional, transformations—numerical, rate of convergence—0.0, number of iterations—500, and minimum stress—0.0. The dimension specification had a range of values, 1 to 6. The dimension resulting in the lowest stress/energy is the dimensionality of the underlying network.

Table 2, FIG. 10, shows dimension and corresponding stress/energy values from the analysis by the tool 100 of the 4-node network. The stress/energy minimum is achieved in dimension 4, hence the tool 100 has correctly determined network dimensionality. Similar experiments were run with more sophisticated dynamical systems and networks. Each of these experiments resulted in the successful determination of system degrees of freedom or dimensionality. These experiments included the determination of the dimensionality of a linear feedback shift register. These devices generate pseudo-random bit streams and are designed to conceal their dimensionality.

From the foregoing, it can be seen that the illustrated embodiment of the present invention provides a method and apparatus for classifying input data. Input data are received and formed into one or more matrices. The matrices are processed using IDMDS to produce a stress/energy value, a rate or change of stress/energy value, a source space and a common space. An output or back end process uses analytical or visual methods to interpret the source space and the common space. The technique in accordance with the present invention therefore avoids limitations associated with statistical pattern recognition techniques, which are limited to detecting only the expected statistical pattern, and syntactical pattern recognition techniques, which cannot perceive beyond the expected structures. Further, the tool in accordance with the present invention is not limited to the fixed structure of neural pattern recognizers. The technique in accordance with the present invention locates patterns in data without interference from preconceptions of models or users about the data. The pattern recognition method in accordance with the present invention uses energy minimization to allow data to self-organize, causing structure to emerge. Furthermore, the technique in accordance with the present invention determines the dimension of dynamical systems from partial data streams measured on those systems through calculation of stress/energy or rate of change of stress/energy across dimensions.

While a particular embodiment of the present invention has been shown and described, modifications may be made. For example, PROXSCAL may be replaced by other IDMDS routines which are commercially available or are proprietary. It is therefore intended in the appended claims to cover all such changes and modifications which fall within the true spirit and scope of the invention.

It is therefore intended that the foregoing detailed description be regarded as illustrative rather than limiting, and that it be understood that it is the following claims, including all equivalents, that are intended to define the spirit and scope of this invention.

The invention claimed is:

1. A classifier process for data, the classifier process comprising:
   using individual differences multidimensional scaling with two or more input symmetric matrices into which the data to be classified has been converted to produce at least a source space output; and
   using the source space output for at least one of to classify the data;
   for pattern recognition;
   for sensor fusion;
   for optical character recognition; and
   for data compression.

2. The classifier process of claim 1 wherein the step of using the source space comprises:
   using the source space to classify the data, including a searching process selected from the group consisting of searching for clustering, searching for hyperplane discriminators, searching for decision surfaces and searching for classifying structures.

3. A method for data compression, the method comprising:
   producing the two or more proximity matrices including the data to be compressed;
   using individual differences multidimensional scaling upon the one or more input proximity matrices to produce a source space output and a common space output; and
   using the source space output and the common space output as a compressed representation of the data.

4. A method for classifying data, the method comprising:
   receiving input data for classification;
   forming two or more symmetric matrices from the received input data;
   applying individual differences multidimensional scaling to the two or more symmetric matrices to produce at least a source space output; and
   using the source space output to classify the received data.

5. The method for classifying data of claim 4 wherein the step of forming two or more symmetric matrices from the received data comprises a processing step selected from the group consisting of forming two or more hollow symmetric matrices, entry-wise substituting the received data to populate two or more symmetric matrices, forming two or more proximity matrices, forming two or more distance matrices, and forming two or more Euclidean distance matrices.

6. The method for classifying data of claim 4 wherein the two or more symmetric matrices contain missing values.

7. The method for classifying data of claim 4 wherein the step of applying individual differences multidimensional scaling comprises applying nonmetric individual differences multidimensional scaling.

8. The method for classifying data of claim 4 wherein the step of using the source space output to classify the received data further comprises the steps of:
   interpreting the source space output as containing contextual signatures of the received data; and
   using the contextual signatures to classify the received data.

9. A pattern recognition method comprising:
   receiving input data;
   forming two or more symmetric matrices from the received input data;
   applying individual differences multidimensional scaling to the two or more symmetric matrices to produce at least a source space output; and
   using the source space output for pattern recognition.

10. The method for pattern recognition of claim 9 wherein the step of forming the two or more symmetric matrices from the received data comprises a processing step selected from the group consisting of forming two or more hollow symmetric matrices, entry-wise substituting the received data to populate two or more symmetric matrices, forming two or more proximity matrices, forming two or more distance matrices and forming two or more Euclidean distance matrices.

11. The pattern recognition method of claim 9 wherein the two or more symmetric matrices contain missing values.

12. The pattern recognition method of claim 9 wherein the step of applying individual differences multidimensional scaling comprises applying nonmetric individual differences multidimensional scaling.

13. The pattern recognition method of claim 9 wherein the step of using the source space output to recognize patterns in the received data further comprises the steps of:
   interpreting the source space output as containing contextual signatures of the received data; and
   using the contextual signatures to recognize patterns in the received data.

14. A method for optical character recognition, the method comprising:
   receiving input data representative of optimal character data;
   forming two or more symmetric matrices using the received input data;
   applying individual differences multidimensional scaling to the two or more symmetric matrices to produce at least a source space output; and using the source space output for optical character recognition.

15. The method for optical character recognition of claim 14 wherein the step of forming the two or more symmetric matrices from the received data comprises a processing step selected from the group consisting of: forming two or more hollow symmetric matrices, entry-wise substituting the received data to populate two or more symmetric matrices, forming two or more proximity matrices, forming two or more distance matrices and forming two or more Euclidean distance matrices.

16. The method for optical character recognition of claim 14 wherein the two or more symmetric matrices contain missing values.

17. The method for optical character recognition of claim 14 wherein the step of applying individual differences multidimensional scaling comprises applying nonmetric individual differences multidimensional scaling.

18. The method for optical character recognition of claim 14 wherein the step of using the source space output to recognize characters in the received data further comprises the steps of:
  interpreting the source space output as containing contextual signatures of the received data; and
  using the contextual signatures to recognize characters in the received data.

19. A method for data compression comprising:

receiving input data for compression;

forming two or more symmetric matrices from the received input data;

applying individual differences multidimensional scaling to the two or more symmetric matrices to produce at least a source space output; and using the source space output for data compression.

20. The method for data compression of claim 19 wherein the step of forming the two or more symmetric matrices from the received data comprises a processing step selected from the group consisting of:
  forming two or more hollow symmetric matrices, entry-wise substituting the received data to populate two or more symmetric matrices, forming two or more proximity matrices, forming two or more distance matrices and forming two or more Euclidean distance matrices.

21. The method for data compression of claim 19 wherein the source space output comprises contextual signatures of the received data.

22. The method for data compression of claim 19 wherein the contextual signatures comprise compressed data.

* * * * *